United States Patent Office 3,525,720
Patented Aug. 25, 1970

3,525,720
PARTIALLY OXIDIZED INTERPOLYMERS OF MONOOLEFINS AND POLYENES WHICH CURE BY OXIDATIVE MECHANISM
Marco Wismer, Gibsonia, and Paul J. Prucnal, Cheswick, Pa., assignors to PPG Industries, Inc., a corporation of Pennsylvania
No Drawing. Filed Oct. 22, 1965, Ser. No. 502,312
Int. Cl. C08f *15/04, 15/40*
U.S. Cl. 260—80.5                                    20 Claims

ABSTRACT OF THE DISCLOSURE

This invention relates to an organic, solvent-soluble, partially-oxidized interpolymer of a polyunsaturated hydrocarbon and at least one monoolefin having a single copolymerizable ethylenic group, said interpolymer having prior to oxidation an essentially saturated carbon chain containing a substantial proportion of the total carbon atoms in the polymer molecule and at least about 2 percent by weight of ethylene unsaturation in the polymer molecule, said interpolymer containing after oxidation at least about 0.5 percent by weight of added combined oxygen, and compositions derived therefrom.

---

This invention relates to polyunsaturated hydrocarbon-monoolefin interpolymers which have been modified to improve certain properties thereof, and more particularly to such interpolymers which have been partially oxidized.

Interpolymers of ethylene, propylene and similar ethylenic hydrocarbons with small amounts of interpolymerized polyunsaturated compounds are of increasing commercial interest. For the most part, such interpolymers as known heretofore are elastomers characterized by their rubbery properties, and in common with conventional rubbers, are cured by vulcanization, generally utilizing sulfur as the vulcanizing agent.

Recently, interpolymers of ethylenic hydrocarbons and polyunsaturated compounds have been obtained which can be cured by an oxidative mechanism in air, and which can be employed in coating compositions applied by conventional means to provide cured coatings of highly desirable properties. Interpolymers of this type are disclosed, for example, in copending applications Ser. No. 413,326, filed Nov. 23, 1964; Ser. No. 460,544, filed June 1, 1965; and Ser. No. 473,235, filed July 19, 1965. The interpolymers of this class contain a substantial proportion of polyunsaturated hydrocarbon, interpolymerized with one or more monoolefins having a single copolymerizable ethylenic group. They are obtained by polymerization in the presence of transition metal catalyst.

It has now been discovered that certain properties of the aforesaid interpolymers are improved by reacting the interpolymer with a controlled amount of oxygen or oxidizing agent, so as to effect partial oxidation of the interpolymer. The partial oxidation provides such properties as better compatibility with other coreactive materials, improved pigment wetting, better adhesion to many substrates, and other desirable characteristics. In many cases, curing times are shorter with the oxidized polymers, providing harder films in relatively short times at room temperature. Furthermore, the other advantageous properties of the unmodified interpolymers are retained in those interpolymers modified in accordance with the invention described herein.

The interpolymers employed and which are partially oxidized in accordance with the present invention are characterized by several properties which distinguish them from the rubbery polymers made from dienes and monoolefins. These include the following:

(1) The interpolymers employed herein contain a comparatively high degree of functional unsaturation which permits them to be substantially cured by an oxidative mechanism. Substantial curing by oxidative mechanism means that a thin film of the material upon exposure to air and without added curing agents cures sufficiently to become tack-free and essentially insoluble in aliphatic hydrocarbons, such as heptane. Sufficient curing to achieve a tack-free state takes place within a reasonable time, 24 hours at ordinary room temperature being usually taken as indicative. The temperature of curing can vary; the preferred interpolymers substantially cure at ambient temperatures, and in any event below 100° F., but desirable materials can be produced which require somewhat higher curing temperatures.

These interpolymers, in general, contain at least about 2 weight percent unsaturation, as defined below, and preferably contain at least about 3 percent or more. They may have up to about 25 weight percent unsaturation or even more.

(2) As indicated, the curing properties of these interpolymers differ from that of the rubbery polymers, and the extent of cross-linking thereby achieved is much higher. Whereas the rubbery polymers have a very low cross-link density and require a vulcanizing agent to achieve that, films of the interpolymers employed herein, contrastingly, dry in air without an added curing agent.

(3) The interpolymers herein are of lower molecular weight than are the rubbery polymers, as indicated by their lower intrinsic viscosity. The intrinsic viscosity of the known rubbery polymers is at least 1.0, and usually 1.5 or higher, corresponding to a molecular weight of 50,000 or more. This is considerably higher than the intrinsic viscosity of the present interpolymers, which preferably have an intrinsic viscosity no higher than about 0.9, and usually 0.6 or lower. After oxidation, the partially oxidized interpolymers obtained have an intrinsic viscosity essentially the same as before.

(Intrinsic viscosity is described, for example, in the book by Allen entitled "Techniques of Polymer Characterization," Butterworth Publications, Ltd., London, 1959; the values herein being measured in benzene at 25° C. using an Ubbelohde Dilution Viscometer.)

(4) The interpolymers employed are much more soluble in organic solvents than are the aforesaid rubbery polymers, permitting them to be dissolved in appreciable concentrations while maintaining a usable solution viscosity. The oxidized interpolymers are similarly soluble in organic solvents and have increased solubility in more polar solvents.

For example, the preferred oxidized interpolymers have a Gardner-Holdt viscosity of Z or lower at 15 percent solids concentration in aromatic naphtha (e.g., Solvesso 100) or xylene, and can be applied from solvent-based compositions that have desirable application properties. There can be obtained solutions of the present interpolymers in benzene, xylene, aromatic naphtha, or other solvents containing as much as 70 percent or more resin solids and having a utilizable viscosity, whereas solutions of the rubbery polymers containing only about 10 percent to 15 percent solids are usually completely unworkable.

Many of the properties of these interpolymers are attributable in large part to their structures, which include an essentially saturated carbon chain as the polymer backbone, this chain containing a substantial proportion (i.e., 20 percent or more) of the total carbon atoms in the polymer molecule. Only a small amount of ethylenic unsaturation is in the polymer backbone, and this principally in terminal position, with at least a major part of the unsaturated linkages remaining in the polymer molecules being in pendant groups attached to the main polymer chain. The oxidation reaction is believed to take place at least in part with the unsaturated linkages, and to this extent the oxidized groups are likewise pendant to the main polymer chain.

As indicated, the interpolymers prior to oxidation have at least about 2 percent and preferably 3 percent or more by weight of unsaturation in the polymer. "Percent by weight of unsaturation" as employed herein refers to the weight of groups of the structure

compared to the total weight of interpolymer. For instance, 2 percent by weight of unsaturation means 100 grams of interpolymer contain 2 grams of carbon present in groups of the structure

It may be noted that accurate determination of the extent of unsaturation in these products by common analytical techniques is quite difficult. For example, ordinary iodine value determinations have been found to be unreliable, and accurate analysis by chemical means in general requires very tedious and time-consuming procedures. One method which can be used is infrared spectroscopic examination, in which the quantitative extent of unsaturation is determined by comparing the characteristic peak obtained from the interpolymer with that of a known material of similar structure and previously determined unsaturation level. Another method for determining the extent of unsaturation is by means of nuclear magnetic resonance spectroscopy, such a method being described in the above-mentioned copending applications.

Because the reactivity of the interpolymers herein is such that small but significant amounts of unsaturation may be lost by oxidation or other reaction, handling and exposure of samples used for analysis should be minimized. Otherwise, low values may be obtained on analysis. For this reason, numerical values are best compared only in samples handled similarly.

The proportions of the components of the interpolymer can be varied widely, it being necessary only to interpolymerize sufficient polyunsaturated hydrocarbon with the monoolefin or monoolefins to provide the desired level of unsaturation in the polymer, this amount varying with the particular polyunsaturated compound.

Among the polyunsaturated compounds that can be employed in producing the interpolymers utilized herein are various dienes and other polyenes. Dienes containing nonconjugated ethylenic groups, and to a lesser extent conjugated alicyclic dienes, are preferred. Included among the polyunsaturated compounds that can be employed are cyclic polyenes, such as cycloalkadienes; substituted-norbornenes, e.g., 5-alkenyl-2-norbornene; norbornadiene (bicyclo[2.2.1]-hepta-2,5-diene) and substituted-norbornadienes, e.g., 2-methyl norbornadiene and other 2-alkyl norbornadienes; unsaturated terpenes, such as limonene; and similar compounds. The polyene may contain substituents, such as halogen or oxygen-containing radicals, but in general it is preferred to employ unsubstituted hydrocarbons containing only carbon and hydrogen. Certain dienes exert a marked influence in lowering molecular weight, even when present only in very small amounts during polymerization. Norbornadiene and 4-vinylcyclohexene-1 have this effect.

Some representative examples of other specific polyunsaturated compounds that can be utilized are:

1,4-pentadiene
1,4-hexadiene
1,9-octadecadiene
11-ethyl-1,1-tridecadiene
1,3-cyclopentadiene
5-methyl-1,3-cyclopentadiene
Tricyclopentadiene
5-methyl-1,3-cyclopentadiene dimer
1,4-cyclohexadiene
1,5-cyclooctadiene
1,5,9-cyclododecatriene
1,4,6-cyclooctatriene
5-(2'-butenyl)-2-norbornene
5-(1,5-propenyl)-2-norbornene
5-methylene-2-norbornene
1,8(9)-p-menthadiene
Divinylbenzene
5-vinylbicyclo[2.2.1]hept-2-ene
Bicyclo[4.3.0]nona-3,7-diene Generally speaking, any monoolefin having a single copolymerizable ethylenic group can be interpolymerized with the polyene. Suitable interpolymers for many purposes are made from interpolymerization of the polyunsaturated compound with only a single monoolefin, e.g., copolymers of ethylene and dicyclopentadiene, or propylene and dicyclopentadiene. For other purposes, it is preferred to employ interpolymers of at least two comonomers with the polyunsaturated compound. In either event, it is preferred that ethylene comprise a substantial proportion of the interpolymer, i.e., at least about 20 percent by weight. Classes of preferred interpolymers include copolymers of a nonconjugated diene and ethylene, and interpolymers of a nonconjugated diene, ethylene and at least one other monoolefin having a single terminal ethylenic group.

Of the large number of usable monoolefins, the preferred comonomers include those having the formula

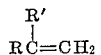

where R is alkyl having, for example, up to about 20 carbon atoms, or aryl, and R' is hydrogen or alkyl of up to about 20 carbon atoms. Compounds of this class include, for instance, propylene, 2-methylpropene, 2-propylhexene-1, 1-butene, 4-methyl-1-pentene, 1-pentene, 1-hexene, 1-octene, 5-methyl-1-nonene, 5,6,6-trimethyl-1-decene, 1-dodecene, 1-tetradecene, 1-octadecene, styrene and vinyl toluene.

When two or more comonomers are utilized, their proportions are not critical since, as mentioned, copolymers of a single monoolefin with the polyunsaturated compound can be employed. The preferred proportions vary depending on the identity of the particular monomers. For example, interpolymers of ethylene, propylene and a nonconjugated diene, usually dicyclopentadiene, generally contain from about 10 percent to about 70 percent of ethylene, from about 10 percent to about 40 percent of propylene, and from about 5 percent to about 50 percent of the diene, while preferred copolymers contain from about 20 percent to about 90 percent of ethylene and from about 10 percent to about 80 percent of a diene, such as dicyclopentadiene. It will be understood that the minimum usable amount of any diene depends to some extent upon its molecular weight. (The above percentages are by weight; the same is true of all parts and percentages throughout this specification unless otherwise specified.)

The interpolymerization of the foregoing monomers is carried out in the presence of a transition metal catalyst of the Ziegler type; examples of Ziegler catalysts (sometimes called Ziegler-Natta catalysts) are described in U.S. Pats. Nos. 3,159,615; 3,153,023; 3,159,615; 3,168,504; and others. They generally involve interaction products of an alkyl aluminum compound and a transition metal compound. In making the interpolymers herein, a preferred catalyst is composed of an organic vanadium compound and an alkyl aluminum halide, with the organic vanadium compound being usually vanadium tris(acetylacetonate) or vanadium oxybis(acetylacetonate). The alkyl aluminum halide co-catalyst is typicaly ethyl aluminum sesquichloride. Other catalyst systems can also be utilized.

In carrying out the interpolymerization, there is employed a liquid reaction medium, which can be an organic solvent or one of the reactants in liquid form. Purified benzene, xylene, toluene, chlorobenzene, or a similar aromatic solvent is generally utilized, although other solvents can be employed. For efficient operation, care should be taken to exclude oxygen and moisture. The temperature is maintained at room temperature or preferably below, e.g., 20° C. or lower, with temperatures as low as −80° C. or lower being advantageously utilized. The catalyst and reactants can all be added initially, or one or more can be added continuously or incrementally. Gaseous reactants are generally fed to the reaction vessel as the polymerization progresses, maintaining saturation of the mixture. Elevated pressures, up to 1000 atmospheres or higher, can be used if desired. The product is usually obtained in solution, and these solutions, after concentration or dilution as desired, can be employed directly in the oxidation. Alternatively, the solid or liquid interpolymer can be isolated and oxidized.

Below are set forth examples illustrating the manner of producing the interpolymers utilized in the invention.

Interpolymer A

A clean, dry reaction vessel was flushed with nitrogen gas and charged with 10 liters of dried benzene. Ethylene and propylene were passed into the solvent at a rate of 6.0 liters and 12.0 liters per minute, respectively, and there were added 176 milliliters of dicyclopentadiene, 50.4 milliliters of bicyclo[2.2.1]hepta-2,5-diene, and 27.4 milliliters of a 1.4 molar solution of ethyl aluminum sesquichloride in benzene. While maintaining the temperature at about 5° C., 50 milliliters of a 0.02 molar solution of vanadium oxybis(acetylacetonate) in benzene were introduced. The off-gas rate dropped to 360 liters per hour and the ethylene and propylene rates were increased to 10 and 20 liters per minute for 1 minute, during which the off-gas rate rose to 720 liters per hour. There were added 5 milliliters of bicycloheptadiene, 17.6 milliliters of dicyclopentadiene, and 50 milliliters of the vanadium oxybis(acetylacetonate) solution, whereupon again all of the gas added was absorbed for a short time and then absorption decreased after 2.5 minutes. The additions were again made as above for a total of 6 additions, with the reaction rate being somewhat lower after each addition. The polymerization was carried out for a total of 44 minutes from the time of the first vanadium catalyst addition. One hundred (100) milliliters of methanol were added to the reaction mixture and it was washed with aqueous HCl, and then washed acid free with distilled water. The benzene was stripped at reduced pressure and replaced with about 2 liters of mineral spirits, and stripping continued until the solution had a solids content of about 47 percent. Infrared analysis of the product showed the absence of free dicyclopentadiene and indicated that the approximately polymer composition was 50 percent ethylene, 20 percent propylene, and 39 percent dicyclopentadiene, all in polymerized form. The intrinsic viscosity of the interpolymer was 0.24 deciliter/gram.

Interpolymer B

The procedure employed in making Interpolymer A was repeated, except that the first addition of dienes (after the initial charge) comprised 35.2 milliliters of dicyclopentadiene and 10 milliliters of bicycloheptadiene. The product solution had a solids content of 38 percent and a Gardner-Holdt viscosity of U-V, and the interpolymer obtained had an intrinsic viscosity of 0.25 deciliter/gram.

Interpolymer C

A clean and dry reaction vessel was charged with 25 liters of dried benzene and sparged with nitrogen for 15 minutes. While passing ethylene and propylene at the rate of 6 liters per minute each into the solution, there were added 17 milliliters of dicyclopentadiene, the mixture was cooled to 5° C., and 5 milliliters of a 1.0 molar solution of ethyl aluminum sesquichloride in benzene were then added. Cooling was maintained throughout the polymerization, which was initiated by the addition of 12.5 milliliters of a 0.02 molar solution of vanadium oxybis(acetylacetonate) in benzene. Polymerization began immediately, as evidenced by the rise in the temperature to 8° C. and complete absorption of all gases passing into the solution, i.e., no off-gas could be observed. After about 1 minute, off-gas began to be observed once more; reaction conditions were maintained for 6 minutes after the addition of the vanadium compound, during which time the temperature dropped slowly to 5° C. The reaction was terminated by the addition of methanol, an the reaction mixture was then washed with aqueous HCl and then washed acid-free with distilled water. Benzene was stripped off and replaced with aromatic naphtha (boiling range 150° C. to 170° C.), and stripping was continued until the solution had a solids content of 8.1 percent and a Gardner-Holdt viscosity of X-Y. The intrinsic viscosity of the interpolymer produced was 0.8 deciliter/gram.

Interpolymer D

Following a similar procedure to those described, a copolymer of ethylene and dicyclopentadiene was made from the following reaction mixture:

| | Milliliters |
|---|---|
| Benzene | 2000 |
| Norbornadiene | 10.2 |
| Dicyclopentadiene | 37.0 |
| Ethyl aluminum sesquichloride (0.45 molar solution in benzene) | 5.3 |
| Vanadium tris(acetylacetonate) (0.02 molar solution in benzene) | 10.0 |

The reaction mixture was maintained at about 20° C. and ethylene was passed into the solution at a rate of 12 liters per minute. The product had a solids content of 34.5 percent and a Gardner-Holdt viscosity of T. The copolymer obtained had an intrinsic viscosity of 0.15 deciliter/gram.

The oxidation of the above interpolymers can be carried out in several ways. For instance, air, oxygen, ozone or the like, can be passed through the interpolymer or a solution of the interpolymer, or an oxygen-releasing agent can be added, or oxygen-containing functional groups can be introduced by reaction of the interpolymer with a material which provides oxidation of the double bonds. Such reactive materials include, for example, peroxides such as benzoyl peroxide and hydrogen peroxide, perbenzoic acid, potassium permanganate, peracetic acid, and the like.

The preferred method is passing oxygen or an oxygen-containing gas through a solution of the interpolymer. This is generally carried out at moderately elevated temperatures, e.g., 50° C. to 150° C., since the oxidation is relatively slow at room temperature. Atmospheric pressure is usually employed because of convenience, although elevated pressures are also useful. Driers, such as metal salts of fatty acids, e.g., the naphthenates, linoleates and resinates of cobalt, lead and similar metals, or other oxidation catalysts, can also be included if desired.

The amount of oxygen incorporated in the partially oxidized interpolymers herein can be varied, but usually at least about 0.5 percent by weight of added combined oxygen should be introduced into the polymer molecule, i.e., at least about 0.5 percent by weight of oxygen should be introduced as a result of the oxidation reaction as described therein. The exact mechanism of the reaction and the precise nature of the oxidized product are not known. It is believed that oxygen reacts with the double bonds in the interpolymer; from infrared spectrographic examination, it is known that at least part of the combined oxygen results in hydroxyl, carboxyl, ether, and other oxygenated groups attached to carbon atoms in the polymer.

The product after the oxidation reaction should be curable, that is, cross-linkable to a hard state, but at the same time retain the viscosity and other characteristics suitable for its intended use, for example, as a coating composition. Thus, the amount of oxidation should not be sufficient to excessively cross-link the interpolymer prematurely. In general, the extent of oxidation should be controlled so as to provide a product which remains soluble in organic solvents, such as ketones, alcohols, aromatic hydrocarbons, aliphatic hydrocarbons, and the like. If, as is usually the case, the oxidation reaction is carried out in organic solvent solution, insolubilization of the interpolymer is easily observed and avoided. While it is only necessary to avoid excess cross-linking as discussed above, in most cases the amount of added combined oxygen does not exceed about 10 percent by weight of the total polymer.

It has been further found that if an excessive amount of oxidation and cross-linking occurs, as evidenced by incipient gel formation, it can be reversed by addition of a trace or a small amount of alcohol, such as ethanol, isopropanol, or other lower alkanol. This affords considerable latitude in carrying out the oxidation process.

As indicated above, the oxidation reaction is preferably carried out using an organic solvent solution of the interpolymer. Essentially any solvent can be employed for this purpose so long as the solvent does not itself unduly oxidize or otherwise interfere with the desired reaction. Aliphatic hydrocarbons, such as pentane, hexane, heptane, and the like; aromatic hydrocarbons, such as benzene, toluene, and similar compounds; and alkylated aromatic hydrocarbon solvents, such as aromatic naphtha, are effectively utilized in this manner, although other solvents, such as ketones, esters and alcohols, can also be employed. Mixtures of the aforesaid solvents, such as are found in aliphatic and aromatic naphthas commercially available, can also be used.

The concentration of the interpolymer in the solvent is not critical, but the lower the proportion of interpolymer present, the slower the oxidation reaction. Conversely, when relatively dilute solutions are employed, it is easier to avoid gelation and to control the amount of oxygen introduced into the interpolymer.

The partially oxidized interpolymers produced in accordance with the invention can be employed in coating compositions and in similar applications as are the unmodified interpolymers as described in the above-mentioned copending applications. Usually, they can be cured by oxidative mechanism, since in most cases there remains sufficient residual unsaturation in the interpolymer molecule to effect such oxidative curing. They can also be cured by heating, whereby the oxidized groups can coreact and cross-link, or they can be co-cured with another coreactive material. Such other coreactive material can coreact before or during curing with the remaining unsaturated linkages, or with the hydroxyl, carboxyl and other groups introduced through the oxidation reaction.

Among the coreactive materials that are employed along with the interpolymers herein to provide desirable compositions are the following:

(1) Fatty acid esters, such as drying oils and semi-drying oils, including linseed oil, soybean oil, tung oil, and the like.

(2) Polycarboxylic acids or anhydrides, such as maleic acid, maleic anhydride, dodeconyl succinic anhydride, and similar compounds.

(3) Polyesters, especially those with high acid numbers, such as the reaction product of 4 moles of phthalic anhydride per mole of pentaerythritol.

(4) Aziridinyl compounds, such as ethylenimine, dodecyl aziridinyl formate, 1-(2-aminoethyl)aziridine, and polymers containing aziridinyl groups.

(5) Polyisocyanates, such as toluene diisocyanate, diphenylmethane diisocyanate, polymethylene polyphenylisocyanate, hexamethylene diisocyanate, and other organic polyisocyanates having 2 to 4 isocyanato groups per molecule.

(6) Polyepoxides, such as diglycidyl ethers of Bisphenol A, 3,4-epoxycyclohexyl-3,4-epoxycyclohexane-carboxylate, and epoxidized oils such as epoxidized soybean oil.

(7) Amide interpolymer resins, such as interpolymers of unsaturated carboxylic acid amides and other ethylenically unsaturated monomers having amide groups reacted with formaldehyde and, usually, an alcohol. Examples of these resins are described in U.S. Pats. Nos. 2,940,945; 2,978,437 and 3,037,963.

(8) Aminoplast resins, such as hexakis (methoxymethyl)melamine and other condensation products of formaldehyde with melamine, urea, benzoguanamine, and similar compounds.

(9) Phenol-aldehyde resins, such as resole resins and novolak resins, for example, the alkaline catalyzed condensates of phenols such as para-t-butyl phenol with excess formaldehyde.

(10) Unsaturated hydrocarbon resins, such as polybutadiene and cyclopentadiene polymers and copolymers.

Compositions containing both the oxidized interpolymers herein and other compatible materials such as those described above can be varied quite widely in proportions and can contain from about 1 percent to 98 percent by weight or even more of the oxidized interpolymer, based upon the total resin solids of the composition. Such compositions are cured in various manners, but generally are curable by heating, with the curing temperature varying with the particular composition. In general, when elevated temperatures are employed, the curing temperature is betwen about 150° F. and about 500° F. Curing catalysts and similar additives can be included in the composition, as can conventional pigments and the like.

The invention will be further described in conjunction with several examples demonstrating various embodiments thereof. All parts and percentages in the examples, as well as throughout this specification, are by weight unless otherwise specified.

EXAMPLE 1

A reaction vessel was charged with a solution of an interpolymer corresponding to Interpolymer A above, containing 352.4 parts of interpolymer, 800 parts of mineral spirits and 1203 parts of aromatic naphtha (boiling range 150° C.–170° C.). This solution was quickly heated to 110° C. and with efficient stirring, oxygen gas was passed into the hot solution at a rate of 1.0 cubic foot per minute. After 6 hours, the oxygen and heating were stopped and the solution was purged with nitrogen gas. Excess solvent was removed by distillation at reduced pressure, and a mixture of 600 parts of isopropanol and 300 parts of butyl acetate was added. The product was a slightly cloudy, pale amber solution having the following analysis and properties:

Interpolymer: Percent
  Carbon _____ 83.97
  Hydrogen _____ 11.43
  Oxygen (by difference) _____ 4.60

Solution:
  Solids content _____ 18.4
  Viscosity (Gardner-Holdt) _____ D-E

The partially oxidized polymer produced had a number of advantageous properties over the corresponding unoxidized polymer. For instance, the unoxidized polymer is difficult to pigment and produces pigmented compositions which have relatively poor properties because of incomplete wetting and dispersion of the pigment. The above oxidized polymer, however, was easier to pigment and produced highly satisfactory coatings, as shown by a test in which a mixture of 400 parts of the above oxidized polymer solution and 400 parts of titanium dioxide were ground in a ball mill for 16 hours. The paste obtained was mixed with sufficient additional oxidized polymer to give a paint with a pigment to vehicle ratio of 0.75 to 1. This paint was sprayed on phosphatized steel panels to give a 1.5 mils thick film, dried at 145° F. for 1 hour, and then baked at 300° F. for 30 minutes. A coating of good appearance was obtained, having the following properties:

Sward hardness—49
Gloss (20° Gardner)—54
Impact resistance (Gardner Variable Impact Tester)— Passed 80/80 inch (direct/indirect)
Flexibility (Gardner Mandrel Bend)—Passed ⅛ inch mandrel Other advantages of the oxidized polymers are shown in specific uses to which they are put. For example, the utility of these polymers in coating interiors of cans for food products was demonstrated by a series of tests in which the oxidized polymer above was coated on 85-pound electrolytic tinplate and baked for 10 minutes at 350° F. Conventional can ends were then formed from the coated tinplate and affixed to cans in which several types of foods were packed. The tests included examples of the three major types of foods, i.e., aqueous acidic foods, aqueous high protein foods, and oil-based high protein foods. The filled and sealed cans were processed in steam at 250° F. for 90 minutes, and then opened and the can ends examined within 1 minute of opening by scribing a cross-mark through the coating with a knife edge and covering the scribed area with pressure-sensitive adhesive tape. The tape is then removed and the area examined both visually and by immersion in acidic copper sulfate solution for 5 minutes, whereby delamination or cracking of the coating is evidenced by deposition of copper. The results of the tests with the above oxidized polymer along with comparative results using unoxidized Interpolymer A, are shown in Table I. The adhesion is a measure of the adherence of the coating to the flat, unformed portion of the can end, while flexibility is a property shown by the amount of delamination of the ridged portion of the can end.

TABLE I

|  | Coating of Example I (oxidized) | Coating of Interpolymer A (unoxidized) |
|---|---|---|
| Cherry pack: |  |  |
| Adhesion | Good | Fair-poor. |
| Flexibility | do | Poor. |
| Corn pack: |  |  |
| Adhesion | do | Fair-poor. |
| Flexibility | do | Poor. |
| Dogfood pack: |  |  |
| Adhesion | Fair-good | Fair-poor. |
| Flexibility | Good | Poor. |

As shown in Table I, the tests indicated that the oxidized polymer had significantly better properties than the unoxidized material.

The oxidized polymers herein have improved properties even at quite low levels of combined oxygen, as shown by the following example.

EXAMPLE 2

A mixture of 100 parts of an interpolymer solution made as was Interpolymer A above and having a 47 percent solids content, and 214 parts of aromatic naphtha (boiling range 150° C.–170° C.) was heated to 90° C. Oxygen gas was passed into the stirred solution at a rate of 0.5 cubic foot per minute for 7 hours, after which the solution was cooled and purged with nitrogen. The oxidized interpolymer product contained about 1 percent combined oxygen. The increased compatibility of the oxidized interpolymers of the invention with various resins was shown by a series of tests in which the oxidized interpolymer of this example was blended with several resins. Films of the resulting compositions, if the resins were compatible, were drawn and baked for 30 minutes at 300° F. with the addition of 0.12 percent metal as driers (10 to 1 mixture of magnesium and cobalt naphthenates). Among the resins employed were a butylated melamine resin made from 6 moles of formaldehyde and 5.3 moles of butanol per mole of melamine, a urea resin made from 2.75 moles of formaldehyde and 2.5 moles of butanol per mole of urea, and an epoxy ester made from esterification of tall oil fatty acids and a Bisphenol A-epichlorohydrin reaction product having an epoxide equivalent of 905–985. Table II below gives the results of the aforementioned tests, wherein compatibility of the materials was shown by obtention of a clear, homogeneous solution and/or a clear film after baking.

TABLE II

| Interpolymer | Resin | Proportion of resin [1] (percent) | Compatibility Solution | Compatibility Film | Film hardness [2] |
|---|---|---|---|---|---|
| Example 2 | Melamine | 15 | Good | Good | 56 |
| Interpolymer A | do | 15 | Fair | Poor | 38 |
| Example 2 | Urea | 20 | Good | Good | 44 |
| Interpolymer A | do | 20 | None | | |
| Example 2 | Epoxy | 20 | Good | Good | 48 |
| Interpolymer A | do | 20 | None | | |

[1] Based on resin solids content.
[2] Sward Rocker.

EXAMPLE 3

A mixture of 130 parts of Interpolymer B (38 percent solids) and 370 parts of aromatic naphtha was heated to about 110° C. and oxygen gas passed into the hot solution at a rate of 0.5 cubic foot per minute for 6 hours. The solution was allowed to cool to room temperature and stand for 15 hours while addition of oxygen continued. The product had an oxygen content of 10.1 percent. An 0.8 mil thick dry film of this product had a Sward hardness of 29 after 24 hours at room temperature (25° C.–28° C.) and a Sward hardness of 47 after 160 hours. In contrast, a 0.9 mil film of unoxidized Interpolymer B had a Sward hardness of only 18 after 160 hours at room temperature. The oxidized polymer also had greater solubility in more polar solvents, as shown by the fact that the product solution could be diluted with an equal volume of isopropanol without precipitation of the polymer.

EXAMPLE 4

A mixture of 100 parts of Interpolymer C (8.1 percent solids) and 70 parts of aromatic naphtha was heated to 110° C. and 0.5 cubic foot per minute of oxygen gas was passed into the solution for 10 hours. Infrared analysis of the product showed that the reaction with oxygen produced hydroxyl, carbonyl and ether groups in the polymer. The product also had increased solubility, as in the foregoing examples, and other improved properties.

The invention is also applicable to copolymers of a single monoolefin and a polyunsaturated hydrocarbon, as shown by the following example.

EXAMPLE 5

A mixture of 85 parts of a copolymer product corresponding to Interpolymer D (containing 34.5 percent resin solids) and 208 parts of aromatic naphtha was heated to 90° C. Oxygen at a rate of 1.0 cubic foot per minute was passed into the solution at this temperature for 9 hours, after which the temperature was slowly raised to 125° C. over a 2-hour period and held there for 85 minutes. The product was cooled and a small amount of isopropanol was added. The solution obtained had a solids content of 18.1 percent in a solvent blend of 90 percent aromatic naphtha and 10 percent isopropanol, and had a Gardner-Holdt viscosity of F-G. The interpolymer had the following analysis:

|  | Percent |
|---|---|
| Carbon | 80.3 |
| Hydrogen | 10.3 |
| Oxygen (by difference) | 9.4 |

Coatings of the foregoing product were drawn as 4-mil thick wet films on phosphatized steel panels. Such coatings after 2 hours at room temperature were tack-free, and after 140 hours had a Sward hardness of 25. Coatings baked for 30 minutes at 300° F. had a Sward hardness of 50.

In the manner of the foregoing examples, partially oxidized polymers having improved and highly desirable properties are produced from other interpolymers within the class described, such as those in the examples of the aforesaid copending applications. Similarly, other methods of oxidation can be employed using, for example, air or other oxygen-containing gas, or other oxidizing agents such as those described. Also, other coreactive materials can be utilized with the above products in addition to those exemplified, and the compositions containing the oxidized polymer alone or in a mixture with other materials can be employed for various purposes in addition to the coating uses described. For instance, the compositions can be used in adhesives, to form unsupported films, in foams, and for other purposes.

According to the provisions of the patent statutes, there are described herein the invention and what are now considered to be its best embodiments. However, it is to be understood that, within the scope of the appended claims, the invention can be practiced otherwise than as specifically described.

We claim:
1. A method of preparing a solvent-soluble partially-oxidized interpolymer which comprises contacting a non-rubbery interpolymer of a cyclic polyene and at least one monoolefin having a single copolymerizable ethylenic group, said interpolymer containing up to 80 percent by weight of said cyclic polyene and having an essentially saturated carbon chain containing a substantial portion of the total carbon atoms in the polymer molecule, at least about 3 percent by weight of ethylenic unsaturation in the polymer molecule and having an intrinsic viscosity of 0.6 or below, with oxygen or a material which oxidizes ethylenic unsaturated double bonds for a time sufficient to incorporate at least about 0.5 percent by weight of oxygen into the polymer molecule, the resultant partially-oxidized interpolymer being curable by an oxidative mechanism and having an intrinsic viscosity of 0.6 or below.

2. The interpolymer of claim 1 wherein said non-rubbery interpolymer contains up to 50 percent of said cyclic polyene.

3. The interpolymer of claim 2 wherein the cyclic polyene is dicyclopentadiene.

4. The interpolymer of claim 1 wherein at least part of said monoolefin is ethylene.

5. The interpolymer of claim 4 wherein the other monoolefin is propylene.

6. The interpolymer of claim 5 wherein the cyclic polyene is dicyclopentadiene.

7. The product of the process of claim 1.
8. The product of the process of claim 2.
9. The product of the process of claim 3.
10. The product of the process of claim 4.
11. The product of the process of claim 5.
12. The product of the process of claim 6.
13. A coating composition wherein the vehicle resin comprises the interpolymer of claim 7.
14. A coating composition wherein the vehicle resin comprises the interpolymer of claim 8.
15. A coating composition wherein the vehicle resin comprises the interpolymer of claim 9.
16. A coating composition wherein the vehicle resin comprises the interpolymer of claim 10.
17. A coating composition wherein the vehicle resin comprises the interpolymer of claim 11.
18. A coating composition wherein the vehicle resin comprises the interpolymer of claim 12.
19. A composition comprising the partially oxidized interpolymer of claim 7 and another material coreactive therewith.
20. The composition of claim 19 wherein said other material is selected from the group consisting of fatty acid esters, polycarboxylic acids or anhydrides, polyester, aziridinyl compounds, polyisocyanates, polyepoxides, amide interpolymer resins, aminoplast resins, phenol-aldehyde resins, and unsaturated hydrocarbon resins.

References Cited

UNITED STATES PATENTS

| 2,829,130 | 4/1958 | Greenspan | 260—82.1 |
| 3,140,275 | 7/1964 | Spooncer | 260—86.7 |
| 3,063,973 | 11/1962 | Gladding | 260—79.5 |
| 3,211,709 | 10/1965 | Adamek | 260—80.7 |

OTHER REFERENCES

Chemical Abstracts, vol. 67, No. 44940u.

JOSEPH L. SCHOFER, Primary Examiner

R. S. BENJAMIN, Assistant Examiner

U.S. Cl. X.R.

117—128.4; 260—33.6, 78.4, 80.7, 80.78, 85.3, 88.2, 848, 854, 873, 889